Oct. 21, 1924.

J. GABOR 1,512,754

VEHICLE VENTILATOR

Filed May 13, 1922

WITNESSES

INVENTOR
Jacob Gabor
BY
ATTORNEYS

Patented Oct. 21, 1924.

1,512,754

UNITED STATES PATENT OFFICE.

JACOB GABOR, OF BROOKLYN, NEW YORK.

VEHICLE VENTILATOR.

Application filed May 13, 1922. Serial No. 560,624.

*To all whom it may concern:*

Be it known that I, JACOB GABOR, a subject of the King of Roumania, and resident of the city of New York, borough of Brooklyn, county of Kings, and State of New York, have invented a new and Improved Vehicle Ventilator, of which the following is a full, clear, and exact description.

My invention relates to a ventilator, and aims to provide a device of this nature particularly adapted for use in association with a vehicle, such as a motor car, although it is not necessarily limited to use in this connection.

It is an object of the present invention to provide a ventilator particularly adapted for association with a closed motor vehicle, and which will present an extremely neat appearance, and which will further serve to ventilate the interior of the same.

Still another object of this invention is that of manufacturing a ventilator capable of being constructed at a nominal figure, and which will prevent the entrance of rain, snow, etc., into the space with which it is connected.

In the annexed drawings a practical embodiment of my invention is illustrated, and it will be seen that;

Figure 1:
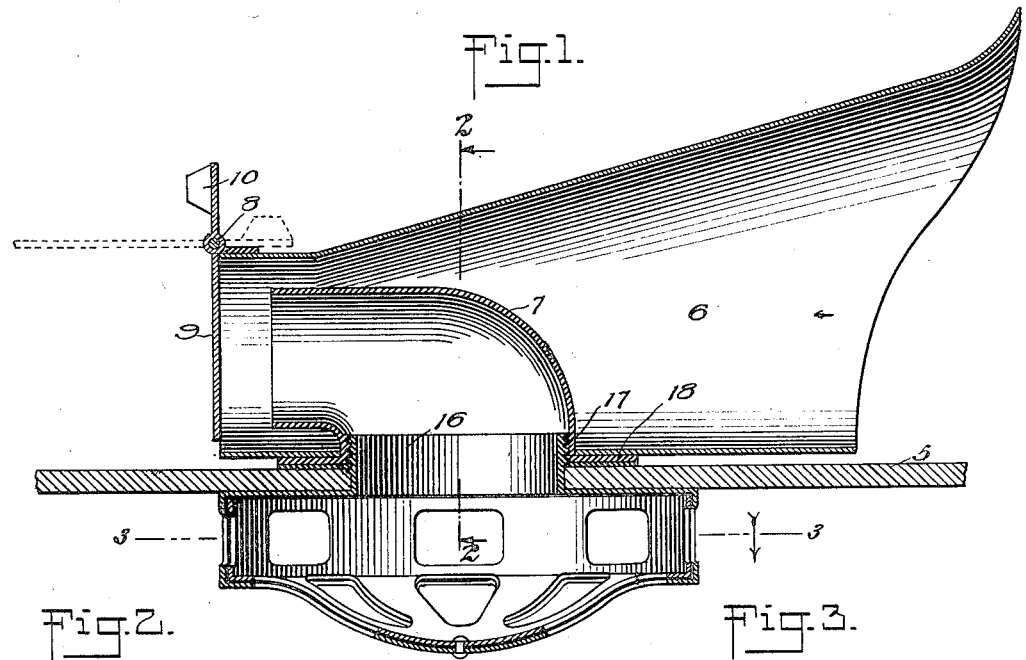
Figure 1 is a sectional side view of a ventilator embodying my improved construction and showing the same associated with the wall of a compartment which is to be ventilated.
Figure 2:
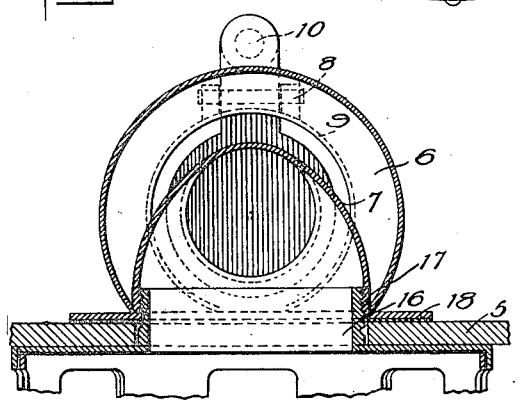
Figure 2 is a transverse sectional view of the said ventilator and taken along the line 2—2 and in the direction of the arrows indicated in Figure 1.

Referring to Figure 1 it will be noted that the reference numeral 5 indicates the support for the ventilator, which support may be the roof of a vehicle.

Associated with the support is my improved type of ventilator which in the embodiment illustrated includes 2 body portions detachably associated with each other, one of the same being disposed above the support while the second of the same is arranged below the same.

The first of these bodies is shown for the sake of illustration as comprising a flared tube 6 which preferably has the lower portion of its body arranged parallel to the supporting surface 5, it being further understood that the larger end of this tube conveniently extends forwardly, while the smaller end of the same extends rearwardly. Extending into this tube and projecting rearwardly therein is a pipe 7 presenting an open end, and it will be obvious, assuming that air is blown through the tube 6 in the direction indicated by the arrow in Figure 1, that this air will blow past the pipe 7 and cause a suction to be exerted upon the open end of the same resulting in air being drawn through its body and discharged from the rear end of the tube 6.

With a view of preventing the entrance of rain, etc., into the ventilator, a flap valve may be swingably attached to the rear end of the tube 6 as at 8 and includes a body 9 which may be counter-balanced by a weight 10. Incident to the weight of the body 9 it will be understood that the valve will normally be closed and guard against any flow of fluid into the rear of the tube 6 or the entrance of rain, etc., at this point. However upon the vehicle, or other member with which the ventilator is associated, moving forwardly, the flow of air into the forward end of the tube will result in the valve being opened to the position indicated in dotted lines in Figure 1, thus causing a suction as aforedescribed, to be exerted upon the pipe 7. Due to this action, in addition to guarding against the entrance of the elements through the body of the ventilator, it will be seen that any danger of air being introduced into the same upon the vehicle backing, or from other causes, will be eliminated.

Figure 3:
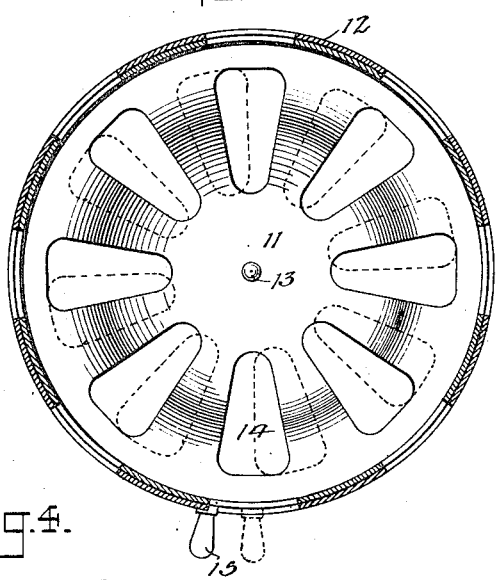
Figure 3 is a sectional plan view taken along the line 3—3 and in the direction of the arrows also indicated in Figure 1.
Figure 4:
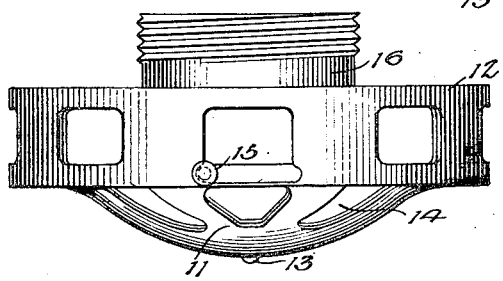
Figure 4 is a side elevation of one portion of the ventilator assembly.

Now with respect to the second major portion of the ventilator and which constitutes the present invention, it will be noted, reference being particularly had to Figures 3 and 4, that this portion may include essentially a pair of casings 11 and 12 rotatably secured together by any suitable means, such as a pin 13, these casings being of such a size that one of the same may nest within the other. Both of these casings are formed with openings 14 which may be brought into alignment with each other by rotating the innermost casing 11 with respect to the outermost casing 12 by any suitable means, such as a handle 15.

Now with a view of connecting the major portions of the ventilator, one with another, it will be seen that the casing 12 has a collar 16 associated with it, this collar being formed with exterior screw threads, which engage with interior screw threads forming a part of the pipe 7 as has been indicated at 17. A plurality of washers 18 of any suitable material may also be interposed between the upper portion of the ventilator and the upper surface of the support 5, and thus upon the parts being tightened through the medium of the screws, any leakage through the opening provided in the support 5 is prevented.

Thus all of the objects of this invention have been accomplished, and it will further be appreciated that numerous modifications of structure might readily be resorted to without in the least departing from the scope of my claim; which is:

In a ventilator for use with vehicles, a pair of nesting casings arranged within the vehicle, each casing including an annular vertical wall having openings and a bottom wall having openings, the bottom walls being pivotally connected at their centers, the outer casing being supported upon the vehicle, the inner casing being rotatably supported within the outer casing, the openings in said casings being adapted to be brought into registry or moved out of registry upon rotation of the casing.

JACOB GABOR.